(12) United States Patent
Hagiwara et al.

(10) Patent No.: US 8,190,105 B2
(45) Date of Patent: May 29, 2012

(54) MODULATION MODE SWITCHING TYPE COMMUNICATION DEVICE AND MODULATION MODE SWITCHING METHOD

(75) Inventors: Takeshi Hagiwara, Tokyo (JP); Kazuhito Souma, Tokyo (JP)

(73) Assignee: NEC Corporation, Tokyo (JP)

( * ) Notice: Subject to any disclaimer, the term of this patent is extended or adjusted under 35 U.S.C. 154(b) by 60 days.

(21) Appl. No.: 12/808,030

(22) PCT Filed: Dec. 3, 2008

(86) PCT No.: PCT/JP2008/071941
§ 371 (c)(1),
(2), (4) Date: Jun. 14, 2010

(87) PCT Pub. No.: WO2009/090806
PCT Pub. Date: Jul. 23, 2009

(65) Prior Publication Data
US 2010/0279614 A1 Nov. 4, 2010

(30) Foreign Application Priority Data
Jan. 17, 2008 (JP) .................................. 2008-007533

(51) Int. Cl.
*H04B 1/66* (2006.01)
(52) U.S. Cl. ....... 455/102; 455/522; 455/69; 455/67.11; 375/295; 375/260
(58) Field of Classification Search .................. 455/102, 455/522, 69, 67.11; 375/295, 260
See application file for complete search history.

(56) References Cited

U.S. PATENT DOCUMENTS

2003/0147474 A1* 8/2003 Ha et al. ......................... 375/295
2006/0198450 A1* 9/2006 Cheng et al. .................. 375/260
2007/0066242 A1* 3/2007 Yi et al. ........................... 455/69
2007/0099648 A1* 5/2007 Kim et al. ...................... 455/522
2007/0253388 A1* 11/2007 Pietraski ....................... 370/338

FOREIGN PATENT DOCUMENTS

JP 2866642 B 12/1998
JP 3423764 B 4/2003
(Continued)

OTHER PUBLICATIONS

International Search Report for PCT/JP2008/071941 mailed Feb. 10, 2009.

(Continued)

*Primary Examiner* — Sanh Phu

(57) ABSTRACT

To adaptively switch a modulation mode according to an operation form of quality-priority and capacity-priority in a multi-value applicable radio device having an active/standby configuration. The comparison unit 28a compares a reception monitoring signal c1 of an active transmission line with a lower-limit threshold LS and an upper-limit threshold HS, while the comparison unit 28b compares a reception monitoring signal c2 of a standby transmission line with the lower-limit threshold and the upper-limit threshold. Then, they output their respective results to a determination unit 28c. The determination unit 28c has therein a low-level flag and a high-level flag that are set/reset based on comparison results in the comparison units 28a and 28b. Conditions for the set/reset are different depending on the operation form. The determination unit 28c determines a modulation mode based on comparison results in the comparison units 28a and 28b and the states of the low-level flags and high-level flags, and outputs modulation mode switching control information e1 and e2.

14 Claims, 9 Drawing Sheets

FOREIGN PATENT DOCUMENTS

| | | | |
|---|---|---|---|
| JP | 2005223835 A | 8/2005 |
| JP | 2006211172 A | 8/2006 |
| JP | 3898192 B | 1/2007 |

OTHER PUBLICATIONS

S. Otsuki et al., "Performance Analysis of Adaptive Modulation Systems with Transmission Diversity Scheme", The Institute of Electronics, Information and Communication Engineers, Technical Report of IEICE, SST95-22, CS95-29, RCS95-31(May 1995), vol. 95, No. 63, May 23, 1995, pp. 31-36.

J. Sangiamwong et al., "QoS-based Adaptive Modulation under Rainfall Environment in Gigabit Millimeter-Wave Broadband Wireless Access System", IEEE, Radio and Wireless Conference, 2003. Rawcon' 03, Proceedings, Aug. 10, 2003, pp. 19-22.

H. Yomo et al., "Modulation Level Selection Algorithm in Software-Based Wireless Multimedia Communications System", Personal, Indoor and Mobile Radio Communications, 2001 12th IEEE International Symposium on, Sep. 30, 2001, vol. 2, pp. G-103-G-107.

M. L. Ammari et al., "Increasing the rate of wireless link when multiple QoS traffics are considered", Vehicular Technology Conference. 2004, VTC 2004-Spring. 2004 IEEE 59th, vol. 2, IEEE, May 17, 2004, pp. 1209-1212.

\* cited by examiner

MODULATION MODE SWITCHING TYPE COMMUNICATION DEVICE AND MODULATION MODE SWITCHING METHOD

This application is the National Phase of PCT/JP2008/071941, filed Dec. 3, 2008, which is based upon and claims the benefit of priority from Japanese patent application No. 2008-007533, filed on Jan. 17, 2008, the disclosure of which is incorporated herein in its entirety by reference.

TECHNICAL FIELD

The present invention relates to modulation mode switching, in particular to a modulation mode switching type communication device and a modulation mode switching method in a point-to-point radio communication system in which the radio transmission line has a redundant configuration of an active system and a standby system.

BACKGROUND ART

An example of a conventional radio transmission system having a 1+0 configuration, i.e., having no redundant configuration of an active system and a standby system (which does not relates to inventions that are disclosed in known publications) is explained hereinafter with reference to FIG. 10. This system is an example in which modulation mode change control is possible. However, since the radio transmission line has no redundancy, no relief can be given against the fading by the switching between the active and standby transmission lines.

FIG. 10 shows the reception side of a conventional modulation mode switching type communication device. An opposed radio communication device has identical functions and performance, though the illustration is omitted. An antenna 31 receives one type of radio frequency and outputs the received radio frequency to a receiving circuit 32. The receiving circuit 32 extracts a radio frequency from the received signal a, converts the extracted radio frequency into an intermediate frequency, and outputs the IF signal b to a demodulation circuit 33. Further, the receiving circuit 32 detects the reception level that fluctuates in a fraction of a second due to effects such as rainfall and fading in an analog fashion, and outputs a reception monitoring signal c that is obtained by performing an A/D (analog/digital) conversion without performing any other processing including averaging to a control circuit 35.

If the reception level is averaged, a delay occurs before the determination of the modulation mode is completed. As a result, in a radio system in which continuous signals are transmitted, fluctuations in the reception level caused by the effects such as rainfall and fading cannot be followed without causing delay, and consequently increasing the possibility that bit errors could occur. Therefore, the averaging of the reception level is not performed.

The reception monitoring signal c input to the control circuit 35 is compared with a lower-limit threshold and an upper-limit threshold. As a result of these comparisons, if the reception monitoring signal c is equal to or lower than the lower-limit threshold, the control circuit 35 changes the modulation multi-valued number to a low multi-value so that the system gain is led to the increasing direction. Further, if the reception monitoring signal c is larger than the upper-limit threshold, it changes the modulation multi-valued number to a high multi-value so that the system gain is led to the decreasing direction.

The instruction for this modulation mode change is output as modulation mode switching control information e1 by the control circuit 35 based on the above-described comparison determination result between the reception level and the thresholds, and also transmitted to an opposed station (not shown). In this way, after the matching of the modulation mode switching control information e1 between the opposed stations is confirmed, the modulation mode of the demodulation circuit 33 of the own station and that of a modulation circuit (not show) in the transmission-side device 2A are changed.

The demodulation circuit 33 reproduces a baseband signal d by demodulating the IF signal b of the receiving circuit 32. This baseband signal d is output after being converted into a bipolar signal, an optical signal, and/or the like in a baseband signal processing circuit 34. The demodulation is performed in a demodulation mode corresponding to the modulation mode based on the above-described modulation mode switching control information e.

Further, as a modulation mode switching communication technique of this kind, other techniques are known in which: the line quality is monitored in the demodulation side: the modulation mode control is switched in synchronization with a frame pulse such that the modulation multi-valued number is decreased when the line quality is deteriorated due to the effects such as rainfall attenuation and fading, whereas the modulation multi-valued number is increased when the line quality is improved; and by doing so, the opposed modulation and demodulation are changed to the same modulation mode so that the signal passage can be realized (for example, see Patent document 1).

Further, other techniques are also known in which, when different frequencies are used between the upward transmission line and the downward transmission and thus there is an asymmetry between them as in the case of the FDD (Frequency Division Duplex) system, the state of the transmission line having a broader transmission band between those transmission lines is preferentially selected, and the modulation mode is determined according to the state of this transmission line (for example, see Patent document 2).

[Patent Document 1]
Japanese Unexamined Patent Application Publication No. 2005-223835 (pages 2, and 10 to 12, and FIG. 1)

[Patent Document 2]
Japanese Patent No. 3898192 (pages 3 and 4, and FIG. 1)

DISCLOSURE OF INVENTION

Technical Problem

Incidentally, point-to-point (P-P) radio communication systems have been used as backbone transmission lines, i.e., mainly as backbones of optical communication channels. Accordingly, they are systems in which ensuring the transmission quality is the primary requirement. Therefore, systems in which radio transmission lines have a redundant configuration of the active and the standby like the FD (Frequency diversity) or SD (Space diversity) configuration so that even when fading occurs, relief is given by selecting the transmission line whose quality has not deteriorated have been provided.

Further, in radio communication systems in which continuous data signals are transmitted, when a bit error occurs, it is immediately regarded as the occurrence of the quality deterioration. Therefore, an instantaneous response to fading is an essential requirement. Therefore, the modulation mode switching control in which reception levels are averaged and determined like the one used in systems in which packet data is transmitted cannot be adopted. Accordingly, it is necessary to perform modulation mode control capable of immediately responding to an instantaneous acquisition result of a reception level. Further, it is important to relief a bit error caused by fading by applying such control to redundant configuration systems of radio transmission lines.

Meanwhile, as for the data transmitted by P-P radio systems, the number of cases where IP packet data, which can be retransmitted, is transmitted rather than telephone calls in which the priority is given to the immediacy has increased in these days. As described above, because of the necessity for immediately transmitting a continuous signal as the backbone of an optical transmission line, the high quality radio transmission is the primary requirement. However, in P-P radio systems to transmit IP packet data, there could be certain operation scenes in which the total transmission capacity should be secured even if the transmission quality and/or immediacy are sacrificed.

However, in any of the above-described related arts, the signal is interrupted while the modulation mode is being switched. Further, the radio transmission line does not have redundancy. Therefore, there is a first problem that if a data signal fluctuates instantaneously due to fading, the quality deterioration of the continuous data signals cannot be relieved.

Further, since the modulation mode is switched based only on the comparison result between the reception monitoring signal and the thresholds, there is a second problem that they do not take the use of modulation modes corresponding to various forms of operations based on customer needs into consideration. That is, as for customer needs, there are cases where the transmission capacity should be secured as much as possible in the total operation time (capacity-priority), and cases where the modulation mode should be switched such that the margin for fluctuations in reception level is ensured in order to prevent the occurrence of a bit error even when rainfall and/or fading occur, and quality maintenance is thereby serviced (quality-priority). However, the modulation modes corresponding to these two operational forms have not been able to be adaptively switched in the past.

Therefore, an object of the present invention is to provide a modulation mode switching type communication device and a modulation mode switching method capable of relieving the deterioration of communication quality due to rainfall and/or fading, adaptively controlling the switching of the modulation mode, and coping with operational forms according to diversifying customer's needs.

Technical Solution

An invention is a modulation mode switching method in a point-to-point radio communication system in which a modulation mode to be used can be switched among n types of modulation modes and a radio transmission line has a redundant configuration of an active system and a standby system, the modulation mode switching method including: a step of setting in advance one of a transmission-quality-priority operational form and a transmission-capacity-priority operational form; a step of setting in advance (n−1) types of lower-limit thresholds used for switching to a modulation mode direction of a system gain increasing direction and (n−1) types of upper-limit thresholds used for switching to a modulation mode direction of a system gain decreasing direction; a step of comparing each of reception levels of a radio transmission line of the active system and a radio transmission line of the standby system with each of the lower-limit thresholds in a different order for each of the operational forms; a step of comparing each of reception levels of a radio transmission line of the active system and a radio transmission line of the standby system with each of the upper-limit thresholds in a different order for each of the operational forms; and adaptively controlling switching among the n types of modulation modes on a switching condition in accordance with purport of the operation form based on a result of each of the comparisons.

An invention is a modulation mode switching method, wherein if a reception level of a radio transmission line exceeds the upper-limit threshold, an upper-limit threshold exceeding state is maintained to deal with an active and a standby until the reception revel becomes equal to or lower than the lower-limit threshold, and in the transmission-quality-priority, the switching condition to the modulation mode of a system gain increasing direction is that one of a reception level of a radio transmission line of the active system and a reception level of a radio transmission line of the standby system becomes equal to or lower than the lower-limit threshold, and the switching condition to the modulation mode of a system gain decreasing direction is that both of the active reception level and the standby reception level exceed the upper-limit threshold.

An invention is a modulation mode switching method, wherein if a reception level of a radio transmission line becomes equal to or lower than an lower-limit threshold, a lower-limit threshold not-exceeding state is maintained to deal with an active system and a standby system until the reception revel exceeds an upper-limit threshold, and in the transmission-capacity-priority, the switching condition to the modulation mode of a system gain increasing direction is that both of a reception level of a radio transmission line of the active system and a reception level of a radio transmission line of the standby system become equal to or lower than the lower-limit threshold, and the switching condition to the modulation mode of a system gain decreasing direction is that one of the active reception level and the standby reception level exceeds the upper-limit threshold.

An invention is a modulation mode switching method, wherein, in the comparison step, a comparison by the upper-limit comparison unit is followed by a comparison by the lower-limit comparison unit in a case of the transmission-quality-priority, whereas a comparison by the lower-limit comparison unit is followed by a comparison by the upper-limit comparison unit in a case of the transmission-capacity-priority.

An invention is a modulation mode switching method, wherein the modulation mode of a system gain increasing direction is QPSK, and the modulation mode of a system gain decreasing direction is QAM.

An invention is a modulation mode switching method, wherein the redundant configuration is a FD (Frequency diversity) configuration.

An invention is a modulation mode switching type communication device in a point-to-point radio communication system in which a modulation mode to be used can be switched among n types of modulation modes and a radio transmission line has a redundant configuration of an active system and a standby system, the modulation mode switching type communication device including: a setting unit in which one of a transmission-quality-priority operational form and a transmission-capacity-priority operational form, and (n−1) types of lower-limit thresholds used for switching to a modulation mode direction of a system gain increasing direction and (n−1) types of upper-limit thresholds used for switching to a modulation mode direction of a system gain decreasing direction are set in advance; a lower-limit comparison unit that compares each of reception levels of a radio transmission line of the active system and a radio transmission line of the standby system with each of the lower-limit thresholds in a different order for each of the operational forms; a upper-limit comparison unit that compares each of reception levels of a radio transmission line of the active system and a radio transmission line of the standby system with each of the upper-limit thresholds in a different order for each of the operational forms; and a determination unit that adaptively controls switching among the n types of modulation modes on a switching condition in accordance with purport of the operation form based on a result of each of the comparisons.

An invention is a modulation mode switching type communication device, wherein the comparison unit includes a high-level flag to deal with an active system and a standby system, the high-level flag being set when a reception level of a radio transmission line exceeds the upper-limit threshold, and being reset when the reception level becomes equal to or lower than the lower-limit threshold, and in a case of the transmission-quality-priority, the switching condition to the modulation mode of a system gain increasing direction is that one of a reception level of a radio transmission line of the active system and a reception level of a radio transmission line of the standby system becomes equal to or lower than the lower-limit threshold; the switching condition to the modulation mode of a system gain decreasing direction is that a reception level of a radio transmission line of the active system (standby system) exceeds the upper-limit threshold and a high-level flag corresponding to the standby system (active system) is being set; and a current modulation mode is maintained in other cases.

An invention is a modulation mode switching type communication device, wherein the comparison unit includes a low-level flag to deal with an active system and a standby system, the low-level flag being set when a reception level of the radio transmission line becomes equal to or lower than the lower-limit threshold, and being reset when the reception level exceeds the upper-limit threshold, and in a case of the transmission-capacity-priority, the switching condition to the modulation mode of a system gain decreasing direction is that one of a reception level of a radio transmission line of the active system and a reception level of a radio transmission line of the standby system exceeds the upper-limit threshold; the switching condition to the modulation mode of a system gain increasing direction is that a reception level of a radio transmission line of the active system (standby system) is equal to or lower than the lower-limit threshold and a low-level flag corresponding to the standby system (active system) is being set; and a current modulation mode is maintained in other cases.

An invention is a modulation mode switching type communication device, wherein, in the comparison step, the comparison unit performs a comparison by the upper-limit comparison unit first and then a comparison by the lower-limit comparison unit in a case of the transmission-quality-priority, whereas the comparison unit performs a comparison by the lower-limit comparison unit first and then a comparison by the upper-limit comparison unit in a case of the transmission-capacity-priority.

An invention is a modulation mode switching type communication device recited, wherein the modulation mode of a system gain increasing direction is QPSK, and the modulation mode of a system gain decreasing direction is QAM.

An invention is a modulation mode switching type communication device, wherein the redundant configuration is a FD (Frequency diversity) configuration.

An invention is a non-transitory modulation mode switching program recording medium in a point-to-point radio communication system in which a modulation mode to be used can be switched between QPSK and QAM and a radio transmission line has a redundant configuration of an active system and a standby system, wherein if the point-to-point radio communication system is in a transmission-quality-priority state, the modulation mode switching program including: a first step of comparing a reception level of the radio transmission line with an upper-limit threshold used for switching to a modulation mode direction of a system gain decreasing direction for each of the active system and standby system; a second step of, if the reception level is equal to or lower than an upper-limit threshold in the first step, comparing a reception level of the radio transmission line with a lower-limit threshold used for switching to a modulation mode direction of a system gain increasing direction for each of the active system and standby system; a third step of, if the reception level is equal to or lower than the lower-limit threshold in at least one of the active system and standby system in the second step, setting a low flag and resetting a high flag for each of the active system and standby system to change the modulation mode to QPSK; a fourth step of, if the reception level exceeds an upper-limit threshold in the first step, resetting a low flag and setting a high flag for each of the active system and standby system; and a fifth step of, if a high flag of the active and a high flag of the standby are set, changing the modulation mode to QAM.

An invention is a non-transitory modulation mode switching program recording medium in a point-to-point radio communication system in which a modulation mode to be used can be switched between QAM and QPSK and a radio transmission line has a redundant configuration of an active system and a standby system, wherein if the point-to-point radio communication system is in a transmission-capacity-priority state, the modulation mode switching program including: a first step of comparing a reception level of a radio transmission line with a lower-limit threshold used for switching to a modulation mode direction of a system gain increasing direction for each of the active system and standby system; a second step of, if the reception level exceeds a lower-limit threshold in the first step, comparing a reception level of a radio transmission line with an upper-limit threshold used for switching to a modulation mode direction of a system gain decreasing direction for each of the active system and standby system; a third step of, if the reception level exceeds the upper-limit threshold in at least one of the active system and standby system in the second step, resetting a low flag and setting a high flag for each of the active system and standby system to change the modulation mode to QAM; a fourth step of, if the reception level is equal to or lower than a lower-limit threshold in the first step, setting a low flag and resetting a high flag for each of the active system and standby system; and a fifth step of, if a low flag of the active system and a low flag of the standby system are set, changing the modulation mode to QPSK.

Advantageous Effects

An advantageous effect of the present invention is that it is possible to provide a modulation mode switching type communication device and a modulation mode switching method capable of relieving the deterioration of communication quality due to rainfall and/or fading, adaptively controlling the switching of the modulation mode, and coping with operational forms according to diversifying customer's needs.

A first reason for this is that the present invention has such a configuration that in a case where the modulation mode is switched among n types of modulation modes having different system gains, (n−1) lower-limit thresholds used to lower the modulation multi-valued number (to ensure the quality by increasing the system gain) and (n−1) upper-limit thresholds used to raise the modulation multi-valued number (to ensure the capacity by decreasing the system gain) are prepared and each of the thresholds is compared with the reception level of both the active and standby systems to determine the modulation mode switching. Further, a second reason for this is that two types of modulation mode switching conditions that are determined according to the quality-priority and the capacity-priority and thus capable of coping with the operational form of a customer can be provided.

That is, when the operation is implemented in the quality-priority, when the reception level of at least one of the active system and the standby system becomes equal to or lower than the lower-limit threshold, control is performed so that the degree of modulation is lowered, whereas only when the reception level of both the active and standby systems becomes larger than the upper-limit threshold, control is performed so that the degree of modulation is raised. Further, the current degree of the modulation is maintained while neither of the above-described phenomena occurs, so that the operation is implemented in the low-multi-value modulation mode as long as possible. As a result of this, fluctuation margin for reception level can be ensured.

On the other hand, when the operation is implemented in the capacity-priority, only when the reception level of both of the active system and the standby system becomes equal to or lower than the lower-limit threshold, control is performed so that the degree of modulation is lowered, whereas when the reception level of at least one of the active and standby systems exceeds the upper-limit threshold, control is performed so that the degree of modulation is raised. Further, the current degree of the modulation is maintained while neither of the above-described phenomena occurs, so that the operation is implemented in the high-multi-value modulation mode as long as possible. As a result of this, the total transmission capacity during the operation is maximized.

Figure 1:
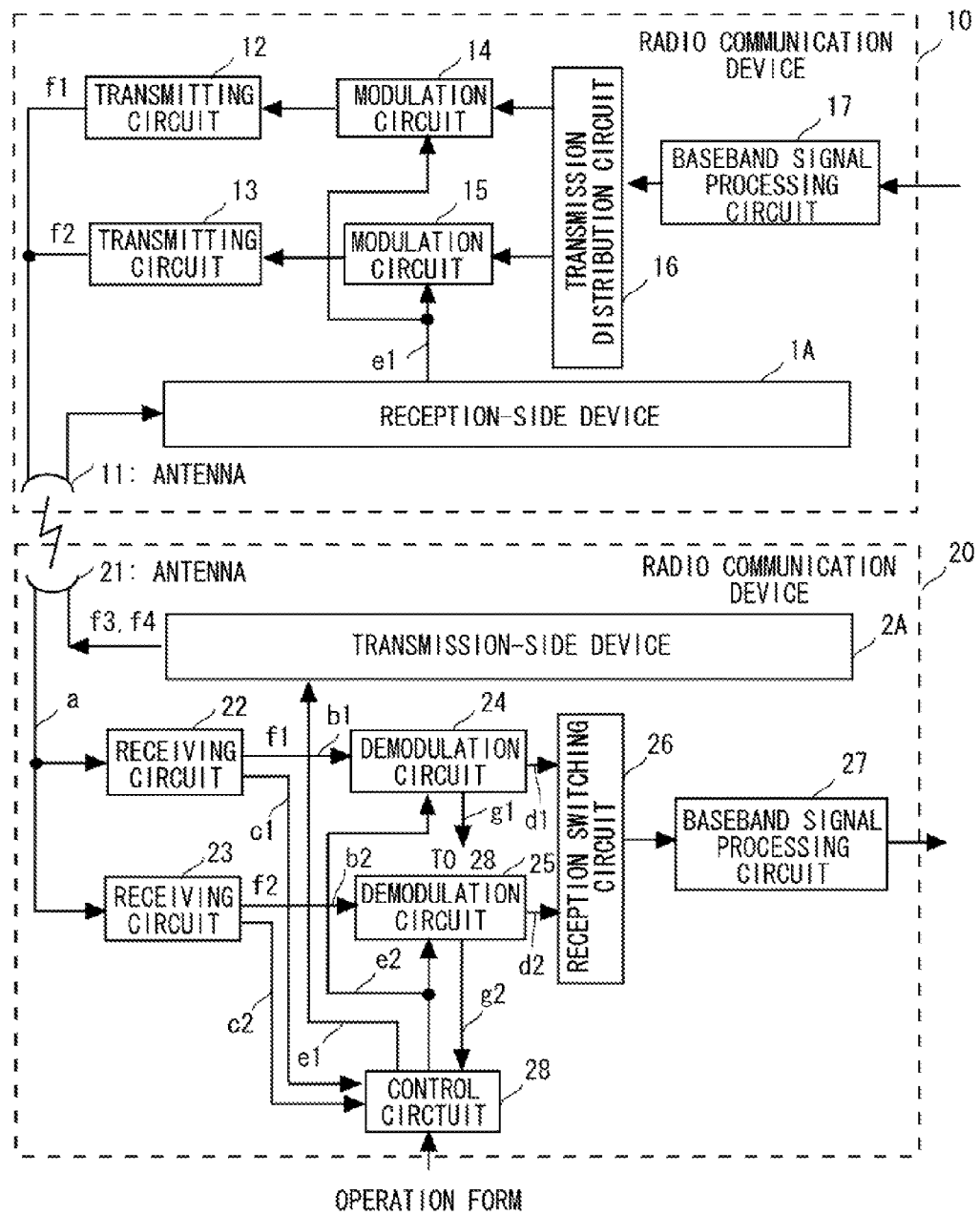
FIG. 1 is a block diagram showing an exemplary embodiment in accordance with a modulation mode switching type communication device according to the present invention.

EXPLANATION OF REFERENCE 11, 21, 31 ANTENNA
12, 13 TRANSMITTING CIRCUIT
14, 15 MODULATION CIRCUIT
16 TRANSMISSION DISTRIBUTION CIRCUIT
17, 27, 34 BASEBAND SIGNAL PROCESSING CIRCUIT
22, 23, 32 RECEIVING CIRCUIT
24, 25, 33 DEMODULATION CIRCUIT
26 RECEPTION SWITCHING CIRCUIT
28, 35 CONTROL CIRCUIT
29 SENSOR CIRCUIT

Best Mode for Carrying Out the Invention

A modulation mode switching method, which is considered to be a best mode for carrying out the present invention, adopts a FD system configuration in which the radio transmission line is doubled with two types of radio frequencies composed of an active system and a standby system. One of the frequencies is allocated for the active system and the other frequency is allocated for the standby system. Radios waves having two types of radio frequencies involve mutually different reception-level fluctuations at different timings due to fading. Therefor, by configuring the radio transmission line with redundancy, it is possible to select a received signal of the side where no fading is occurring and thereby to avoid the occurrence of a bit error in a bipolar signal and/or an optical signal output from the radio device.

Further, as for customer needs, there are the quality-priority in telephone calls and the like in which the quality maintenance is desired to be serviced such that the occurrence of a bit error is prevented as much as possible even when rainfall and/or fading occurs, and the capacity-priority in IP packet data transmission and the like in which the transmission capacity is desired to be secured as much as possible in the total operation time. These customer needs can be also coped with by the present invention. Therefore, two types of thresholds including a lower limit and an upper limit for the reception level are set and used to realize switching control between a modulation mode suitable for the quality-priority and a modulation mode suitable for the capacity-priority.

That is, the reception level of a reception electric field of the active system and the reception level of a reception electric field of the standby system are monitored. Then, in the case of the quality-priority, when one of the reception levels of the reception electric fields of the active and standby systems is equal to or lower than the lower-limit threshold, the modulation mode is switched to the one for increasing the system gain, whereas when both of the reception levels of the reception electric fields of the active and standby systems exceed the upper-limit threshold, the modulation mode is switched to the one for decreasing the system gain. Note that "the system gain" means the ratio between the transmission level and the reception level that is used to enable the signal passage by maintaining the data quality with respect to a certain transmission line level loss during radio transmission.

Further, in the case of the capacity-priority, when one of the reception levels of the reception electric fields of the active and standby systems exceeds the upper-limit threshold, the modulation mode is switched to the one with which the system gain decreases but the transmission capacity increases, whereas when both of the reception levels of the reception electric fields of the active and standby systems are equal to or lower than the lower-limit threshold, the modulation mode is switched to the one with which the system gain increases but the transmission capacity decreases.

As for the modulation mode of P-P radio systems, QPSK and QAM have been known. As is commonly known, QPSK is a modulation mode in which an input signal is converted into four signal points, while QAM converts an input signal into signal points of 16, 32, 64, 128, or the like. The larger the number of points is, the larger amount of information can be transmitted simultaneously. That is, the data transmission capacity becomes larger. However, since the interval between points become narrower and thus the range of permissible error at the time of demodulation and discrimination becomes narrower, the tolerance to noise and distortion becomes smaller and the communication quality thereby deteriorates. On the other hand, when the number of points is small, the point discrimination becomes easier and the tolerance to noise and distortion becomes larger. However, the data transmission capacity becomes smaller.

Therefore, it means the modulation mode suitable for the quality-priority is QPSK and the modulation mode suitable for the capacity-priority is QAM. Accordingly, when the operation is implemented with the quality-priority, the modulation mode is switched so that the operating time in accordance with QPSK is made longer as much as possible, whereas when the operation is implemented with the capacity-priority, the modulation mode is switched so that the operating time in accordance with QAM, which has a higher multi-value, is made longer as much as possible.

[Explanation of Configuration]

Exemplary embodiments in accordance with the present invention are explained hereinafter in detail with reference to the drawings. In the drawings, when the same numeral signs are used, they indicate the same functions or structures.

FIG. 1 is a block diagram showing an exemplary embodiment in accordance with a modulation mode switching type communication device according to the present invention. This radio communication system has a FD system configuration in which a radio transmission line is doubled with two types of radio frequencies f1 and f2 of an active system and a standby system, and is composed of a radio communication device 10 on the transmission side and a radio communication device 20 on the reception side. The radio communication device 10 and the radio communication device 20 have the same configuration and the same function. Note that the illustration of the details of a reception-side device 1A in the radio communication device 10 and a transmission-side device 2A in the radio communication device 20 is omitted in the figure to avoid the complexity of the drawing. The reception-side device 1A is similar to the part of the radio communication device 20 other than the transmission-side device 2A, and the transmission-side device 2A is similar to the part of the radio communication device 10 other than the reception-side device 1A.

The radio communication device 10 is composed of a baseband signal processing circuit 17, a transmission distribution circuit 16, two modulation circuit 14 and 15, two transmitting circuits 12 and 13, and an antenna 11. The modulation circuit 14 and the transmitting circuit 12 constitute an active system, and the modulation circuit 15 and the transmitting circuit 13 constitute a standby system.

The baseband signal processing circuit 17 has a function of converting a bipolar signal and/or an optical signal that is externally input to the radio communication device 10 into a baseband signal expressed as a binary signal ("0" or "1"). The transmission distribution circuit 16 distributes a baseband signal to the active and standby systems. Each of the modulation circuits 14 and 15 converts a baseband signal into an intermediate-frequency signal (IF signal). The transmitting circuit 12 converts an IF signal into a radio signal f1 in a first radio frequency band, and the transmitting circuit 13 converts an IF signal into a radio signal f2 in a second radio frequency band. The antenna 11 transmits the radio signals f1 and f2, and receives radio signals (f3 and f4) from the transmission-side device 2A of the opposed radio communication device 20.

Figure 2:
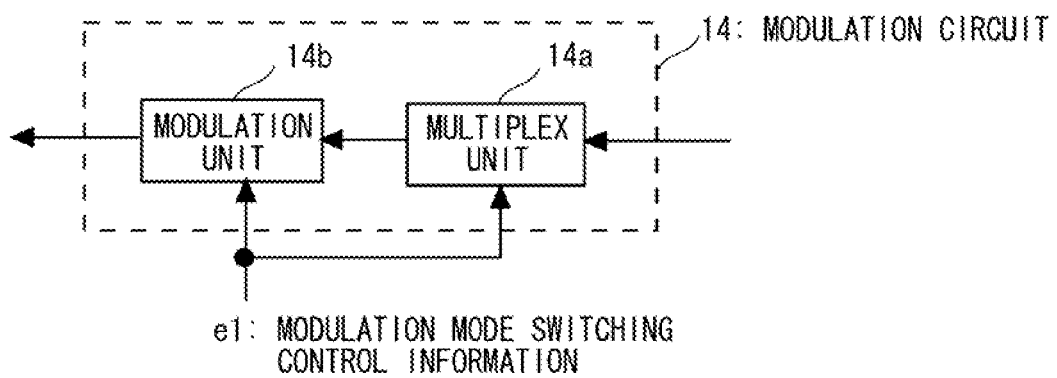
FIG. 2 is a block diagram illustrating details of a modulation circuit in accordance with the present invention.

As shown in detail in FIG. 2, the modulation circuit 14 includes a multiplex unit 14a and a modulation unit 14b. The multiplex unit 14a multiplexes the baseband signal of a main signal input from the transmission distribution circuit 16 and modulation mode switching control information e1 supplied from the reception-side device 1A, and the modulation unit 14b converts the multiplexed signal into an intermediate-frequency signal by modulating it in the current modulation mode (modulation mode before the modulation mode switching). By multiplexing the baseband signal and the modulation mode switching control information e1, the modulation mode switching control information e1 can be transmitted to the opposed device. Needless to say, there is also a modulation circuit like the modulation circuit 14 in the transmission-side device 2A.

The radio communication device 20 is composed of an antenna 21, two receiving circuit 22 and 23, two demodulation circuits 24 and 25, a reception switching circuit 26, a baseband signal processing circuit 27, a control circuit 28, and a transmission-side device 2A. The receiving circuit 22 and the demodulation circuit 24 constitute an active system, and the receiving circuit 23 and the demodulation circuit 25 constitute a standby system.

The antenna 21 receives a reception signal a, in which is the radio signal f1 of the active system and the radio signal f2 of the standby system are combined, and outputs the reception signal a to the receiving circuit 22 and 23. The receiving circuit 22 extracts the radio signal f1 of the active system from the reception signal a, converts the radio signal f1 into an intermediate frequency (IF signal) b1, and outputs the intermediate frequency b1 to the demodulation circuit 24. Meanwhile, the receiving circuit 23 extracts the radio signal f2 of the standby system from the reception signal a, converts the radio signal f2 into an intermediate frequency (IF signal) b2, and outputs the intermediate frequency b2 to the demodulation circuit 25.

Further, the receiving circuit 22 detects the reception level of the reception signal a, which instantaneously fluctuates, in an analog fashion, and outputs a reception monitoring signal c1, which is obtained by performing an A/D (analog/digital) conversion without performing any additional processing, to the control circuit 28. Meanwhile, the receiving circuit 23 detects the reception level of the reception signal a, which instantaneously fluctuates, in an analog fashion, and outputs a reception monitoring signal c2, which is obtained by performing an A/D (analog/digital) conversion without performing any additional processing, to the control circuit 28

The reception level, which is detected in an analog fashion, is never averaged. If the reception level is averaged, a delay occurs before the determination of the modulation mode is completed. As a result, in a radio system in which continuous signals are transmitted, fluctuations in the reception level caused by the effects such as rainfall and fading cannot be followed without causing delay, and consequently increasing the possibility that bit errors could occur.

The demodulation circuit 24 demodulates the IF signal b1 of the receiving circuit 22 to reproduce a baseband signal d1 and outputs the baseband signal d1 to the reception switching circuit 26. Meanwhile, the demodulation circuit 25 demodulates the IF signal b2 of the receiving circuit 23 to reproduce a baseband signal d2 and outputs the baseband signal d2 to the reception switching circuit 26.

The reception switching circuit 26, which is equipped with a memory function that is used to relieve arrival time fluctuations of data signals supplied from the active and standby systems, selects one of the baseband signals d1 and d2 of the active and standby systems that is not affected by fading without causing any instantaneous interruption, and outputs the selected baseband signal to the baseband signal processing circuit 27. The baseband signal processing circuit 27 converts the baseband signal into a bipolar signal, an optical signal, and/or the like, and externally outputs the converted signal.

The control circuit 28 has therein two thresholds (lower-limit threshold LS and upper-limit threshold HS) for switching control, based on which the switching between two types of modulation modes is performed according to modulation mode switching condition suitable for the quality-priority and a modulation mode switching condition suitable for the capacity-priority. Further, prior to the operation, a user sets one of the operation forms of the quality-priority and the capacity-priority in the radio communication device 20 by using a switch or the like, and the control circuit 28 can recognizes the set operation form.

Figure 3:
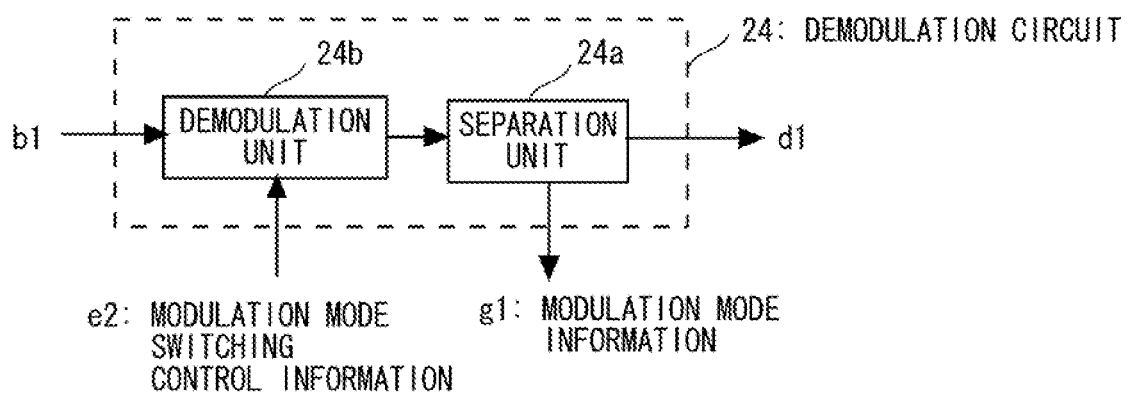
FIG. 3 is a block diagram illustrating details of a demodulation circuit in accordance with the present invention.

As shown in detail in FIG. 3, the demodulation circuit 24 includes a separation unit 24a and a demodulation unit 24b. The demodulation unit 24b demodulates an IF signal b1 in a modulation mode based on modulation mode control information e2 supplied from the control circuit 28 to reproduce a baseband signal and outputs the baseband signal to the separation unit 24a. The separation unit 24a separates modulation mode information g1 from the baseband signal input from the demodulation unit 24b and outputs the modulation mode information g1 to the control circuit 28. Further, the separation unit 24a reproduces a baseband signal d1 of the main signal, which was obtained by separating the modulation mode information g1 from the input baseband signal, and outputs the baseband signal d1 to the reception switching circuit 26. Needless to say, there is also a demodulation circuit like the demodulation circuit 24 in the reception-side device 1A.

Figure 4:
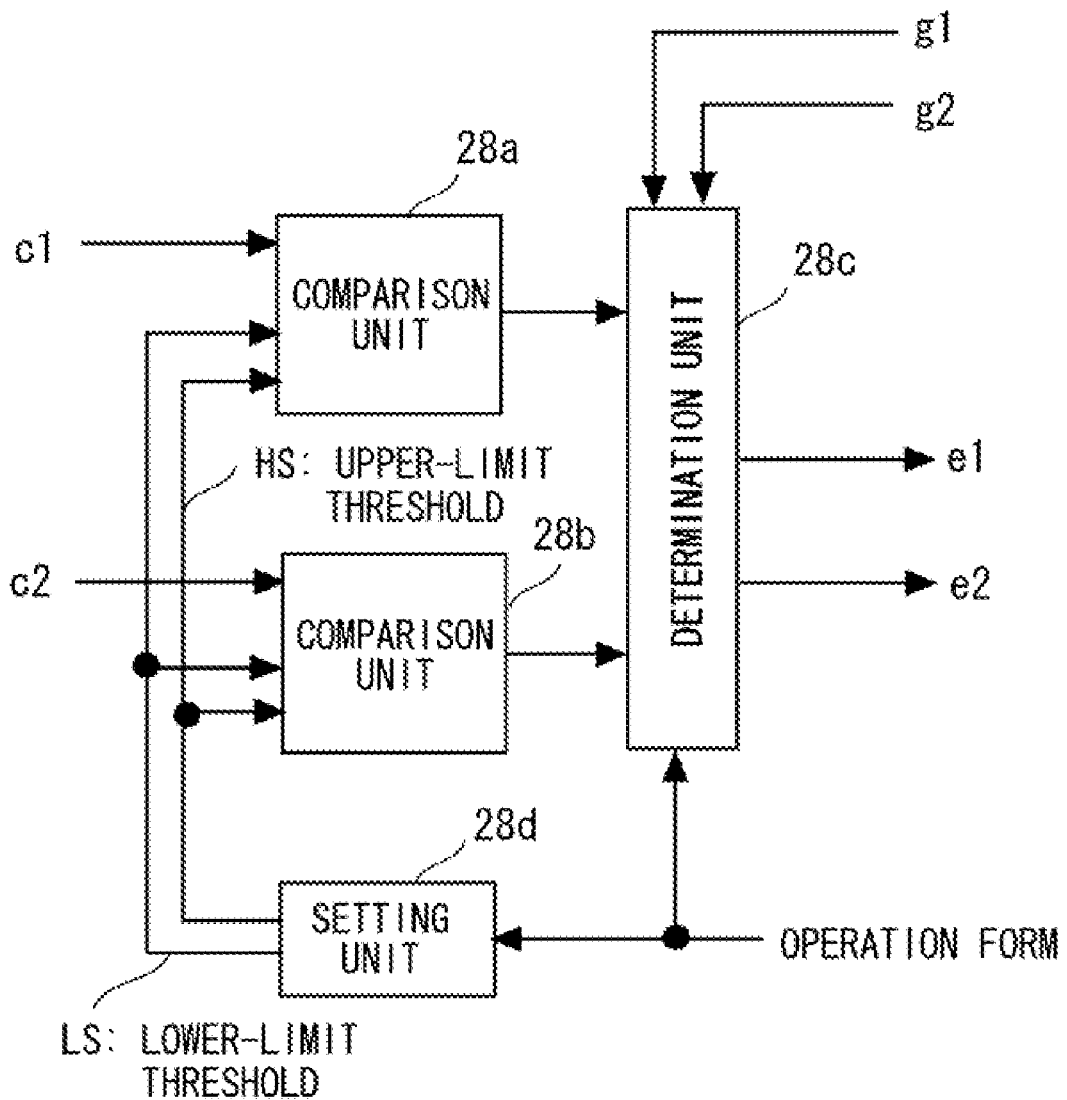
FIG. 4 is a block diagram illustrating details of a control circuit in accordance with the present invention.

As shown in detail in FIG. 4, the control circuit 28 includes two comparison units 28a and 28b, a determination unit 28c, and a setting unit 28d. Needless to say, there is also a control circuit like the control circuit 28 in the reception-side device 1A. The setting unit 28d refers to the operation form that is preferentially set, and outputs it to the comparison units 28a and 28b. Further, the setting unit 28d also outputs the lower-limit threshold LS and upper-limit threshold HS that are set in advance to the comparison units 28a and 28b. Each of the comparison units 28a and 28b is composed of an upper-limit comparison unit that compares its upper-limit threshold HS with a reception monitoring signal, and a lower-limit comparison unit that compares its lower-limit threshold LS with the reception monitoring signal.

The comparison unit 28a compares a reception monitoring signal c1 supplied from the receiving circuit 22 with the lower-limit threshold LS and with the upper-limit threshold HS and outputs its result to the determination unit 28c. Meanwhile, the comparison unit 28b compares a reception monitoring signal c2 supplied from the receiving circuit 23 with the lower-limit threshold LS and with the upper-limit threshold HS and outputs its result to the determination unit 28c. As described later, the procedure of these comparisons is changed depending on the operation form.

The determination unit 28c has therein low-level flags L1 and L2 and high-level flags H1 and H2 to deal with the active and standby systems. The low-level flags L1 and L2 and high-level flags H1 and H2 are set/reset based on comparison results in the comparison units 28a and 28b. The conditions for the set/reset are different depending on the operation form. The determination unit 28c determines the modulation mode based on the comparison results in the comparison units 28a and 28b and the states of the low-level flags L1 and L2 and high-level flags H1 and H2, and outputs modulation mode switching control information e1 and e2.

The logic of the modulation mode determination is different depending on the operation form. The modulation mode switching control information e1 is sent to the radio communication device 10 through the transmission-side device 2A and used for the switching of the modulation mode. After the switching of the modulation mode in the radio communication device 10 is confirmed, the modulation mode switching control information e2 is sent to the modulation circuits 14 and 15 and the demodulation circuits 24 and 25 and used for the switching of the modulation mode in the radio communication device 20. The switching of the modulation mode in the radio communication device 10 can be confirmed in the radio communication device 20 by the occurrence of signal interruption that is caused by the difference of modulation modes between the radio communication device 10 and the radio communication device 20.

In the transmission-side device 2A, as described above, the modulation mode switching control information e1 is multiplexed into the main signal in the multiplex unit 14a of the modulation circuit (corresponding to FIG. 2). In the reception-side device 1A, when this signal is received through the antenna 11, the modulation mode information g1 is extracted and separated in the separation unit 24a of the demodulation circuit (corresponding to FIG. 3) of the reception-side device 1A and sent to the determination unit 28c of the control circuit (corresponding to FIG. 4) as described above. The modulation mode information g1 is modulation mode switching control information e1 that is multiplexed in the opposed device.

In the determination unit 28c, the modulation mode information g1 is input from the demodulation circuit 24 and modulation mode information g2 is input from the demodulation circuit 25. The modulation mode information g1 and g2 is based on information transmitted from the opposed radio communication device. Further, if the opposed radio communication device has the initiative in determining the modulation mode, the determination unit 28c determines the modulation mode according to the initiative of the opposed radio communication device. Assume that the radio communication device 20 has the initiative in the following explanation.

[Details of Modulation Mode Switching]

Figure 5:
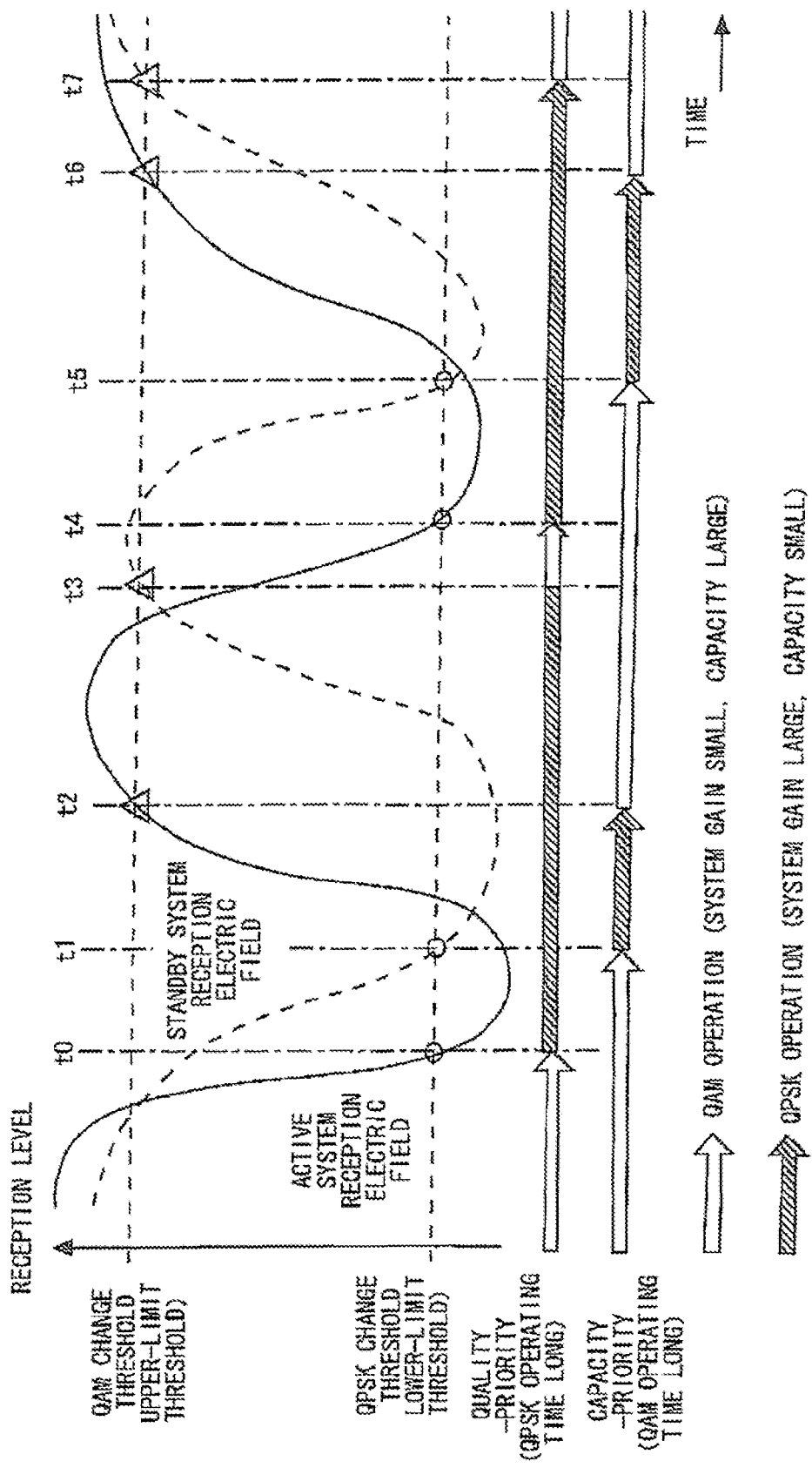
FIG. 5 is a waveform chart for explaining details of modulation mode switching in accordance with the present invention.

Next, details of the modulation mode switching performed based on the difference between the quality-priority and capacity-priority operation forms are explained with reference to FIG. 5. FIG. 5 shows an active system reception electric field (solid line) and a standby system reception electric field (dotted line) when different reception level fluctuations occur in the radio transmission lines of the active system and the standby system in a FD system. The horizontal axis represents time, and the vertical axis represents the reception level of respective reception electric fields. The modulation mode switching is performed by changing the degree of modulation. Further, an example in which two-step switching control of QPSK and QAM is performed is shown. The lower-limit threshold LS is a QPSK change threshold, and the upper-limit threshold HS is a QAM change threshold. In this case, the switching from QPSK to QAM is switching to a direction for decreasing the system gain, and the switching from QAM to QPSK is switching to a direction for increasing the system gain.

When the quality-priority operation is implemented, if either one of the reception level of the reception monitoring signal c1 of the active system and the reception level of the reception monitoring signal c2 of the standby system becomes equal to or lower than the lower-limit threshold LS (QPSK change threshold) (timing t0 in FIG. 5, condition 1), control is performed so that the degree of modulation is lowered to QPSK. Further, if both of the reception levels of the reception monitoring signal c1 of the active system and the reception monitoring signal c2 of the standby system exceed the upper-limit threshold HS (QAM change threshold) (timing t7 in FIG. 5, condition 2), control is performed so that the degree of modulation is raised to QAM. The current degree of modulation is maintained until the condition 2 is satisfied even if the reception level goes out of the condition 1, or until the condition 1 is satisfied even if the reception level goes out of the condition 2. In this way, the system margin is secured.

With this control method, since the operating time in QPSK in which the degree of modulation is low (system gain is high, and tolerance to C/N (Carrier/Noise) ratio is high) can be made longer, the possibility that the quality deteriorates due to the decrease in the reception level caused by effects such as rainfall and/or fading can be reduced in comparison to the QAM operation. Therefore, effective setting for the operation form in which the quality maintenance is essential can be realized. Although there is a time period between timings t0 and t3 during which the reception level of the reception monitoring signal c1 or the reception level of the standby reception monitoring signal c2 rises and exceeds the upper-limit threshold HS, the QPSK operation is maintained as indicated by the bar line at the bottom of FIG. 5 because the condition 2 is never satisfied.

However, the condition 2 is satisfied at the timing t3 and the operation is thereby switched to the operation in QAM. This is because the reception level of the reception monitoring signal c2 exceeds the upper-limit threshold HS, and the reception monitoring signal c1 once exceeded the upper-limit threshold HS at the timing t2 and the exceeding state is retained until the timing t4. At the timing t4, the reception monitoring signal c1 becomes equal to or lower than the lower-limit threshold LS, the operation performed in QPSK again. The timing t4 to the timing t7 should be interpreted in a similar manner.

When the capacity-priority operation is implemented, if both of the reception level of the reception monitoring signal c1 of the active system and the reception level of the reception monitoring signal c2 of the standby system become equal to or lower than the lower-limit threshold LS (QAM change threshold) (timings t1 and t5 in FIG. 5, condition 3), control is performed so that the degree of modulation is lowered to QPSK. Further, if either one of the reception levels of the reception monitoring signal c1 of the active system and the reception monitoring signal c2 of the standby system exceeds the upper-limit threshold HS (QAM change threshold) (timings t2 and t6 in FIG. 5, condition 4), control is performed so that the degree of modulation is raised to QAM. The current degree of modulation is maintained until the condition 4 is satisfied even if the reception level goes out of the condition 3, or until the condition 3 is satisfied even if the reception level goes out of the condition 4.

With this control method, since the operating time in QAM in which the degree of modulation is high can be made longer, transmission of a larger amount of data capacity can become possible. Although there are time periods between timings t1 and t2 and between timings t5 and t6 during which the reception level of the reception monitoring signal c1 or the reception level of the standby reception monitoring signal c2 rises and goes out of the condition 3, the QPSK operation is maintained as indicated by the bar line at the bottom of FIG. 5 because the condition 4 is never satisfied. Further, although there is a time period between timings t2 and t5 during which the reception level of the reception monitoring signal c1 or the reception level of the standby reception monitoring signal c2 falls and goes out of the condition 4, the QAM operation is maintained as indicated by the bar line at the bottom of FIG. 5 because the condition 3 is never satisfied.

Note that even in the 1+1 configuration as described above, if the radio transmission line does not have a redundancy configuration due to a power-supply stop state or the like, the switching condition for the 1+0 configuration is applied. That is, whether the operation is implemented in the quality-priority or the capacity-priority, if the reception level becomes equal to or lower than the lower-limit threshold LS (condition 1=condition 3), control is performed so that the degree of modulation is lowered to QPSK, whereas if the reception level exceeds the upper-limit threshold HS (condition 2=condition 4), control is performed so that the degree of modulation is raised to QAM. The logic for maintaining the degree of modulation is the same as that described above. If described in terms of the reception level of the reception monitoring signal c1, control is performed so that the degree of modulation is raised during the timing t0 to t2 and t4 to t6 and the degree of modulation is lowered during the timing t2 to t4 and the timing t6 and subsequent timing.

Note that there are two possible sequences including a collective switching sequence and a successive switching sequence as the modulation mode switching control procedure. In the collective switching sequence, the modulation modes of the modulation circuit and the demodulation circuit of the active system and the modulation circuit and the demodulation circuit of the standby system are switched in synchronization with each other based on the modulation mode switching control signal e.

In the successive switching sequence, the modulation mode switching of the active system and the modulation mode switching of the standby system are performed in sequence. In this case, the control circuit 28 confirms the switching state of the reception switching circuit 26 and switches the modulation mode of the system that is not selected by the reception switching circuit 26, e.g., the standby system before the other system. Then, after the control circuit 28 confirms the completion of that modulation mode change, the control circuit 28 causes the reception switching circuit 26 to switch the operation from the active system to the standby system and, after that, controls the switching of the modulation mode of the previous active system. An advantage of this sequence control is that the signal interruption time, which would otherwise continue until the modulation modes of the opposed modulation circuit and demodulation circuit match with each other, can be avoided by performing the switching control to the standby system. However, since it requires the sequence processing time, the response characteristic to sudden changes due to rainfall and/or fading deteriorates.

[Explanation of Operation]

Figure 6:
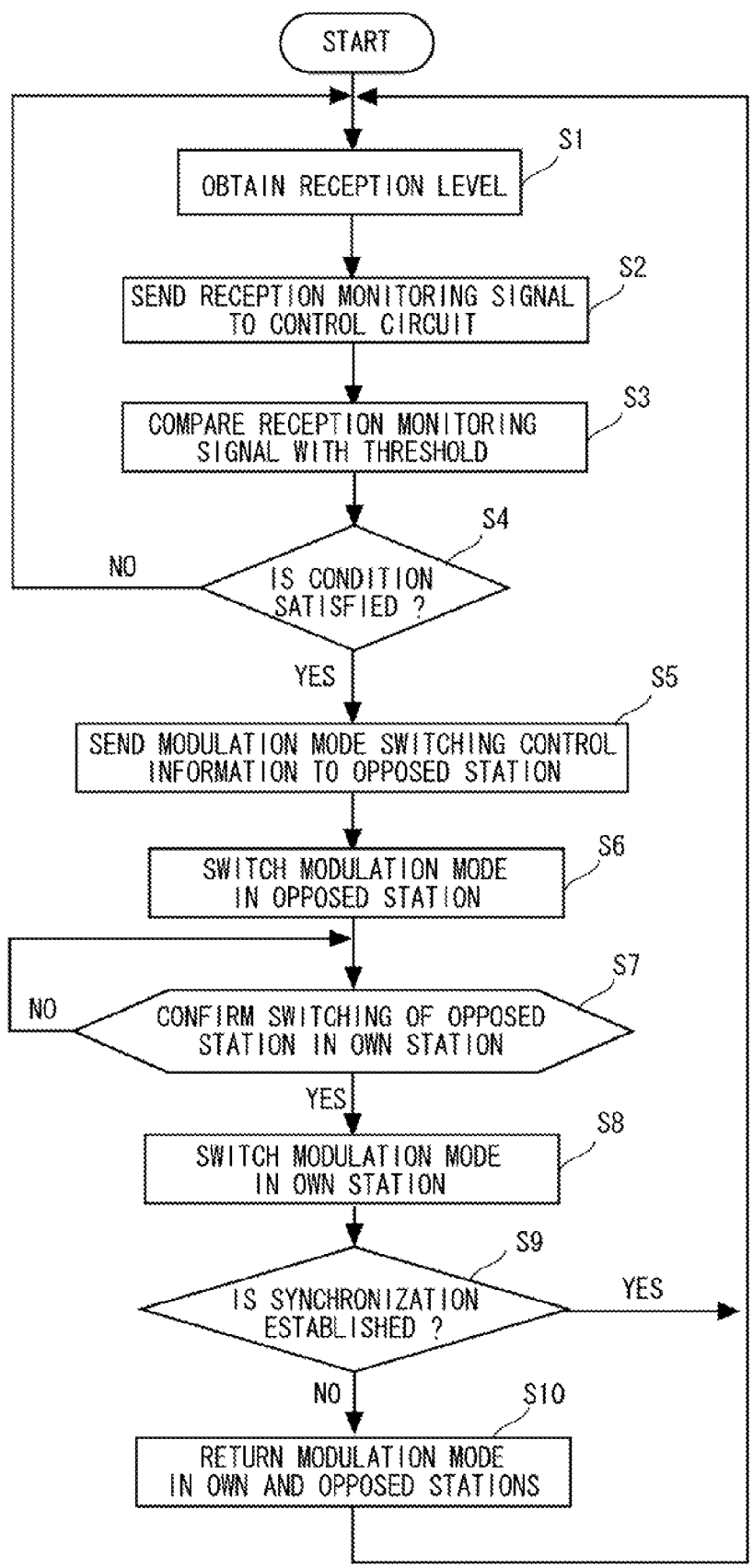
FIG. 6 is a flowchart for explaining a modulation mode switching operation in accordance with the present invention.

A modulation mode switching operation of the modulation mode switching type communication device having the configuration described above is explained with reference to flowcharts shown in FIGS. 6 to 8. FIG. 6 shows an overall modulation mode switching operation. Now, assume that a radio communication device 20 (own station) in FIG. 1 receives a transmission signal from a radio communication device 10 (opposed station) through antenna 11 and 21.

When the receiving circuits 22 and 23 acquire instantaneous values of the reception revels of the active and standby systems (step S1 in FIG. 6), they send the acquired reception level information (reception monitoring signals c1 and c2) to the control circuit 28 (step S2). The control circuit 28 compares the reception monitoring signals c1 and c2 with a lower-limit threshold LS and an upper-limit threshold HS that are set in advance (step S3), and makes a decision on the modulation mode switching based on the conditions 1 to 4 (step S4).

If modulation mode switching is to be performed, the transmission-side device 2A multiplexes modulation mode switching control information e into the main signal as switching request information, and wirelessly transmits the multiplexed signal to the opposed station (step S5). The switching control of the modulation mode is performed while the information is transmitted under a signal passage state between the opposed stations that are forming a radio transmission line. This is because if the modulation modes do not match between the opposed stations, any signal cannot be passed therebetween.

In the opposed station, when the reception-side device 1A receives the modulation mode switching control information e, which has been wirelessly transmitted, the modulation mode of the modulation circuits 14 and 15 and the demodulation circuit (not shown) included in the reception-side device 1A is switched in response to the request (step S6). From this moment, since the modulation modes of the own station and the opposed station do not match with each other, synchronization cannot be established between the opposed stations, thus causing signal interruption.

In the own station, the fact that the opposed station has changed the modulation mode is confirmed by the asynchronous state (signal interruption) (step S7), and the modulation mode of the demodulation circuits 24 and 25 and the modulation circuit included in the transmission-side device 2A is switched (step S8). If the change control is properly completed, reception signal synchronization is established in the demodulation circuits 24 and 25 with the modulation mode that is adopted after the switching (step S9). Therefore, the modulation mode switching control is completed and signals can be passed between the opposed devices.

In contrast to this, if the synchronization of a reception signal cannot be established within a predetermined time that is counted by the control circuit of each of the opposed stations (step S9), it means that the switching control is not properly completed. Therefore, the modulation circuit and the demodulation circuit of the control circuit of each of the opposed station and the own station are restored to the modulation mode that is used before the switching by themselves. For example, after control is performed so that the modulation mode is switched from QAM to QPSK, if the signal passage (synchronization establishment) cannot be accomplished after a predetermined time has elapsed, the modulation mode of both the own station and opposed station are returned to QPSK by themselves. The predetermined time is a time that is established between the opposed stations, and counted by a timer possessed by the control circuit 28 in both the transmission side and reception side. This counting starts at the moment when the modulation mode is switched.

Next, details of the steps S3 and S4 in FIG. 6 are explained with reference to FIGS. 7 and 8. FIG. 7 corresponds to an operation form of the quality-priority and FIG. 8 corresponds to an operation form of the capacity-priority. The operation form is set in advance in the control circuit 28 according to customer's needs.

Figure 7:
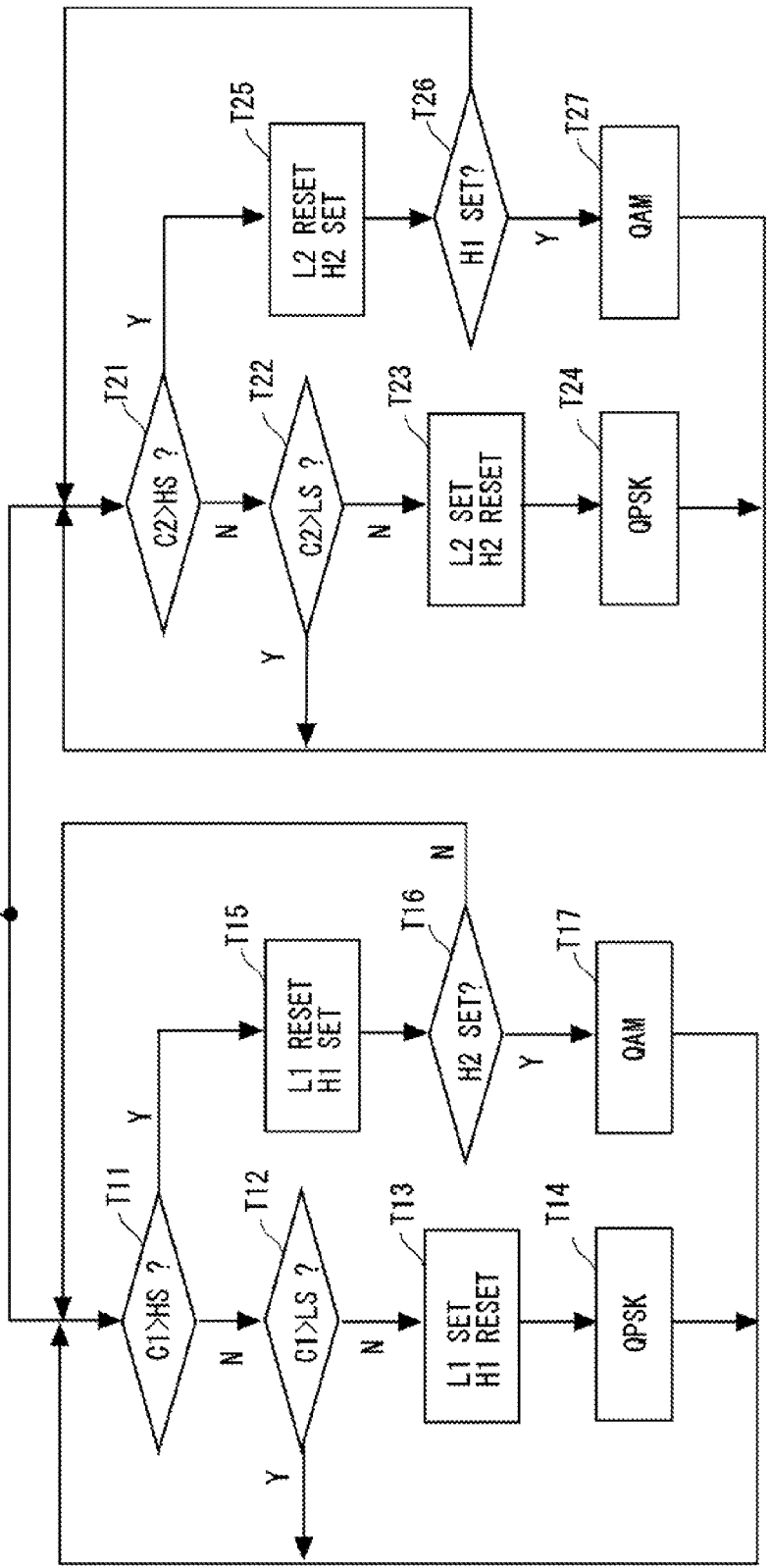
FIG. 7 is a flowchart of modulation mode switching in a case of quality-priority.

In FIG. 7, in the case of the quality-priority, the reception monitoring signal c1 of the active system is compared with the upper-limit threshold HS (step T11 in FIG. 7). As a result of the comparison, if the value of c1 is equal to or lower than the upper-limit threshold HS (N at step T11), the reception monitoring signal c1 is also compared with the lower-limit threshold LS (step T12 in FIG. 7). As a result, if the value of c1 is equal to or lower than the lower-limit threshold LS (N at step T12), the low-level flag L1 of the active system is set and the high-level flag H1 of the active system is reset (step T13). Further, since the condition 1 is satisfied, an instruction to change the modulation multi-valued number to a low multi-value is issued (step T14). However, if the value of c1 exceeds the lower-limit threshold LS (Y at step T12), the process returns to the step T11.

With regard to the reception monitoring signal c2 of the standby system, processing similar to the above-described processing of the reception monitoring signal c1 of the active system is performed (steps T21 to T24). In the step T23, the low-level flag L2 of the standby system is set and the high-level flag H2 of the active system is reset (step T23). Further, since the condition 1 is satisfied, an instruction to change the modulation multi-valued number to a low multi-value is issued (step T24).

In the step T11 of the active system, if the value of c1 is higher than the upper-limit threshold HS (Y at step T11), the low-level flag L1 of the active system is reset and the high-level flag H1 of the active system is set (step T15). At this point, if the high-level flag H2 of the standby system is being set (Y at step T16), the condition 2 is satisfied and therefore an instruction to change the modulation multi-valued number to a high multi-value is issued (step T17). On the other hand, if the high-level flag H2 of the standby system is not being set (N at step T16), the process returns to the step T11.

With regard to the reception monitoring signal c2 of the standby system, processing similar to the above-described processing of the reception monitoring signal c1 of the active system is performed (steps T25 to T27). In the step T26, if the high-level flag H1 of the active system is being set (Y at step T26), the condition 2 is satisfied and therefore an instruction to change the modulation multi-valued number to a high multi-value is issued (step T27). On the other hand, if the high-level flag H1 of the active system is not being set (N at step T26), the process returns to the step 121.

In FIG. 7, the processes are illustrated, for simplifying the illustration, as if they are performed simultaneously between the active system and the standby system. However, those processes are usually performed in an alternate fashion. Needless to say, they can be performed simultaneously.

Further, the procedure shown in FIG. 7 can be implemented by a program that is executed in a CPU constituting the control circuit 28.

Figure 8:
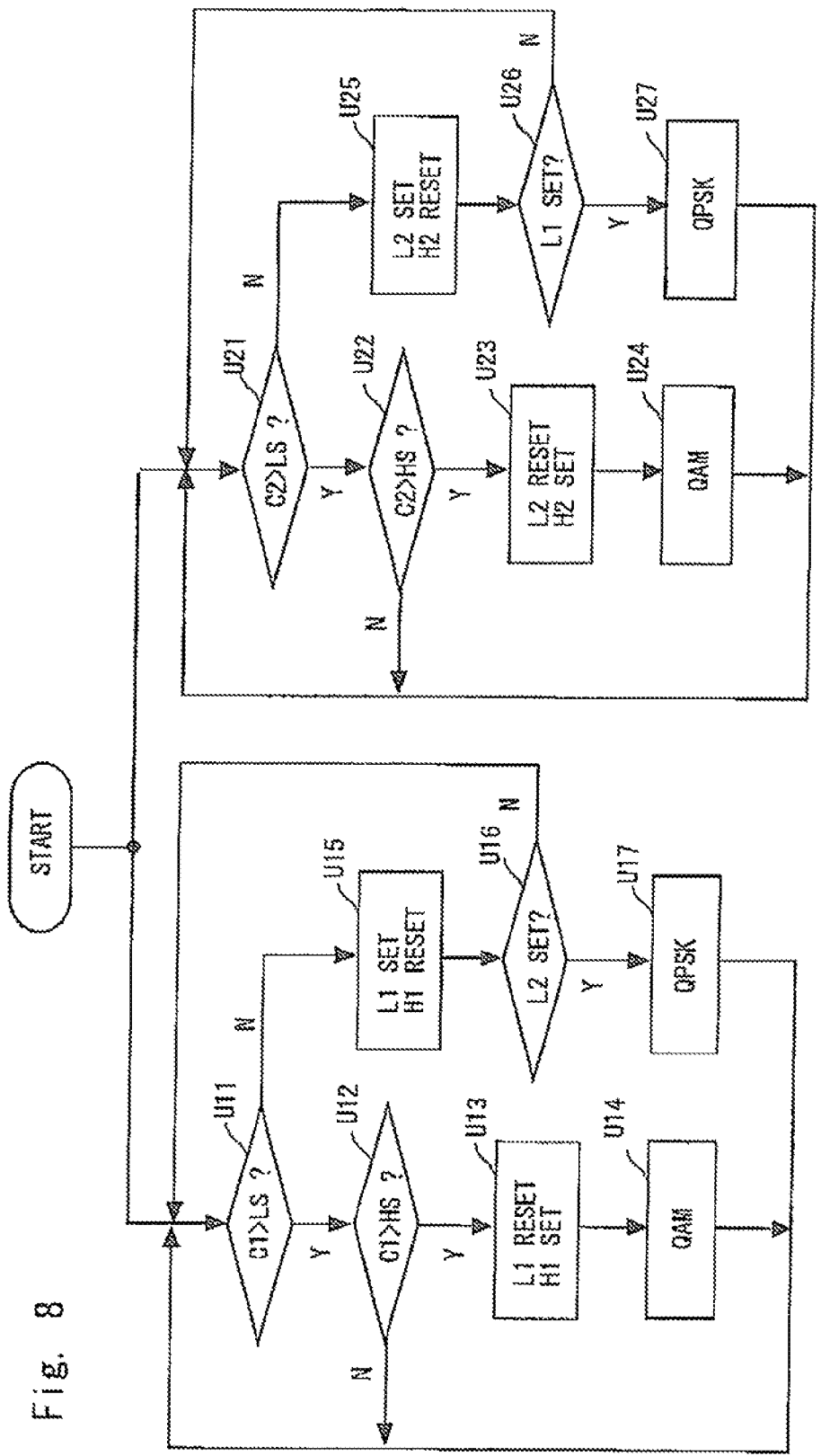
FIG. 8 is a flowchart of modulation mode switching in a case of capacity-priority.

In FIG. 8, in the case of the capacity-priority, the reception monitoring signal c1 of the active system is compared with the lower-limit threshold LS (step U11 in FIG. 8). As a result of the comparison, if the value of c1 is higher than the lower-limit threshold LS (Y at step U11), the reception monitoring signal c1 is also compared with the upper-limit threshold HS (step U12). As a result, if the value of c1 is higher than the upper-limit threshold HS (Y at step U12), the low-level flag L1 of the active system is reset and the high-level flag H1 of the active system is set (step U13). Further, since the condition 3 is satisfied, an instruction to change the modulation multi-valued number to a high multi-value is issued (step U14). However, if the value of c1 is equal to or lower than the upper-limit threshold HS (N at step U12), the process returns to the step U11.

With regard to the reception monitoring signal c2 of the standby system, processing similar to the above-described processing of the reception monitoring signal c1 of the active system is performed (steps U21 to U24). In the step U23, the low-level flag L2 of the standby system is reset and the high-level flag H2 of the active system is set. Further, since the condition 3 is satisfied, an instruction to change the modulation multi-valued number to a high multi-value is issued (step U24).

In the step U11 of the active system, if the value of c1 is equal to or lower than the lower-limit threshold LS (N at step U11), the low-level flag L1 of the active system is set and the high-level flag H1 of the active system is reset (step U15). At this point, if the low-level flag L2 of the standby system is being set (Y at step U16), the condition 4 is satisfied and therefore an instruction to change the modulation multi-valued number to a low multi-value is issued (step U17). On the other hand, if the low-level flag L2 of the standby system is not being set (N at step U16), the process returns to the step U11.

With regard to the reception monitoring signal c2 of the standby system, processing similar to the above-described processing of the reception monitoring signal c1 of the active system is performed (steps U25 to U27). In the step U26, if the low-level flag L1 of the active system is being set (Y at step U26), the condition 4 is satisfied and therefore an instruction to change the modulation multi-valued number to a low multi-value is issued (step U27). On the other hand, if the low-level flag L1 of the active system is not being set (N at step U26), the process returns to the step U21.

In FIG. 8, the processes are illustrated, for simplifying the illustration, as if they are performed simultaneously between the active system and the standby system. However, those processes are usually performed in an alternate fashion. Needless to say, they can be performed simultaneously.

Further, the procedure shown in FIG. 8 can be implemented by a program that is executed in a CPU constituting the control circuit 28.

Embodiment

Figure 9:
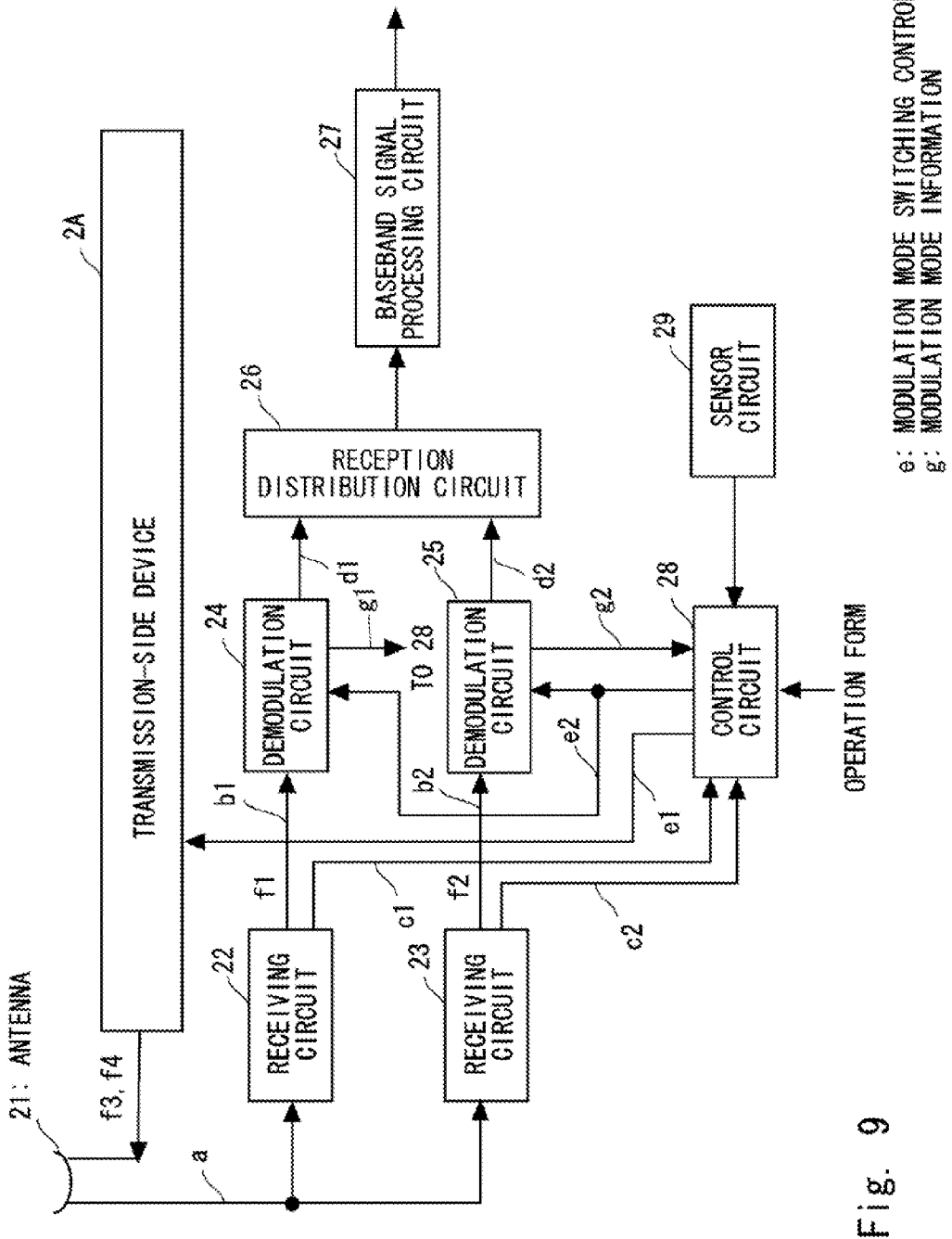
FIG. 9 is a block diagram showing another example of a modulation mode switching type communication device in accordance with the present invention.
Figure 10:
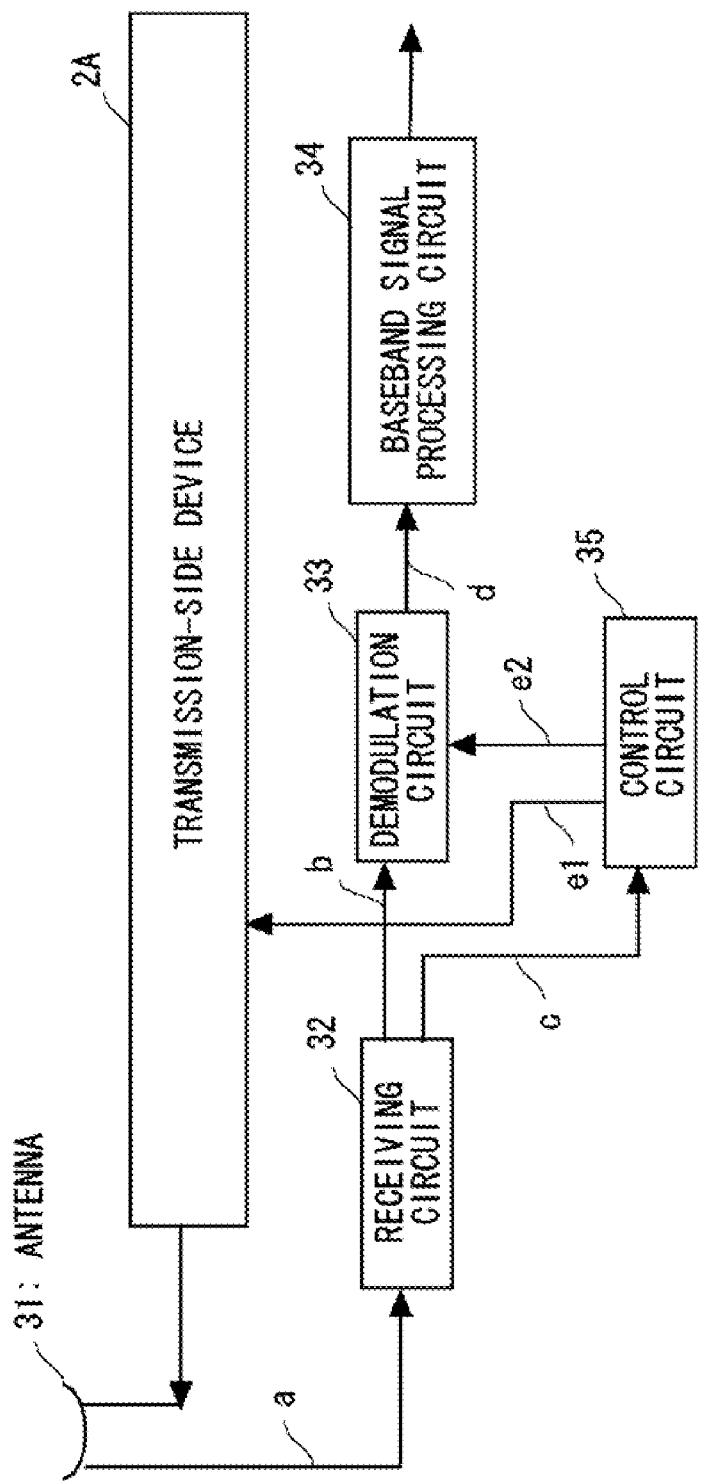
FIG. 10 is a block diagram showing an example of a conventional modulation mode switching type communication device having a 1+0 configuration.

FIG. 9 shows a configuration in which the control circuit 28 has an additional feature but the other fundamental structures are the same as those described above as another exemplary embodiment in accordance with the present invention.

In this figure, a sensor circuit 29 is added in the radio communication device 20 shown in FIG. 1, and a result from the sensor circuit 29 is input to the control circuit 28. The sensor circuit 29, which is a sensor capable of measuring, for example, a temperature, a humidity, rainfall, and an atmospheric pressure, outputs measured data to the control circuit 28. When a certain indication of weather change such as a decrease in the atmospheric pressure is detected, the control circuit 28 performs switching control of the modulation mode before the rain starts. In this way, it is possible to perform switching control of the modulation mode in advance while predicting the change of reception level, and thereby to provide a modulation switching type radio communication device capable of implementing a more detailed operation.

Examples in which switching is performed between two modulation modes have been explained so far. However, in a more general manner, the modulation mode may be switched among n types of modulation modes (n is integer greater than one). In such cases, the reception level is compared with (n−1) types of lower-limit thresholds LS and (n−1) types of upper-limit thresholds HS.

For example, in a case of n=4 (QPSK-16 QAM-32 QAM-128 QAM), there are three types of thresholds. A lower-limit threshold 11 and an upper-limit threshold 21 between QPSK and 16 QAM, a lower-limit threshold 12 and an upper-limit threshold 22 between 16 QAM and 32 QAM, and a lower-limit threshold 13 and an upper-limit threshold 23 between 32 QAM and 128 QAM are set. That is, the lower-limit threshold 11 is a threshold to perform control "16 QAM->QPSK"; the lower-limit threshold 12 is a threshold to perform control "32 QAM->16 QAM"; and the lower-limit threshold 13 is a threshold to perform control "128 QAM->32 QAM". Similarly, the upper-limit threshold 21 is a threshold to perform control "QPSK->16 QAM"; the upper-limit threshold 22 is a threshold to perform control "16 QAM->32 QAM"; and the upper-limit threshold 23 is a threshold to perform control "32 QAM->128 QAM". In this manner, the switching control of the modulation mode is determined by comparing an acquired reception level with 2(n−1) types of thresholds.

Examples of a FD (Frequency diversity) configuration in which the radio transmission line has a redundancy configuration of the active system and the standby system have been explained so far. However, the present invention is not limited to configurations like them, and can be also configured as an SD (Space diversity) configuration, i.e., a configuration in which each of the transmission side and the reception side uses two antennas so that two physically-separated radio transmission lines are used while using radio waves having the same frequency. In such a configuration, if the explanation is to be made by referring to FIG. 1, the transmitting circuit 12 and the transmitting circuit 13 are not connected to each other but are connected to their individual antennas in the radio communication device 10. Similarly, the receiving circuit 22 and the receiving circuit 23 are not connected to each other but are connected to their individual antennas in the radio communication device 20. Other structures and functions are the same as those of the above-described example in which different frequencies are used.

Although the present invention has been explained with reference to certain exemplary embodiments so far, the present invention is not limited to the above-described exemplary embodiments. Those skilled in the art can make various modifications to the configuration and details of the present invention without departing from the purpose of the present invention.

Industrial Applicability

The present invention relates to modulation mode switching, and is applicable to, in particular, a modulation mode switching type communication device and a modulation mode switching method in a point-to-point radio communication system in which a radio transmission line have a redundant configuration of an active system and a standby system.

The invention claimed is:

1. A modulation mode switching method in a point-to-point radio communication system in which a modulation mode to be used can be switched among n types of modulation modes and a radio transmission line has a redundant configuration of an active system and a standby system, the modulation mode switching method comprising:
   a step of setting in advance one of a transmission-quality-priority operational form and a transmission-capacity-priority operational form;
   a step of setting in advance (n−1) types of lower-limit thresholds used for switching to a modulation mode direction of a system gain increasing direction and (n−1) types of upper-limit thresholds used for switching to a modulation mode direction of a system gain decreasing direction;
   a step of comparing each of reception levels of a radio transmission line of the active system and a radio transmission line of the standby system with each of the lower-limit thresholds in a different order for each of the operational forms;
   a step of comparing each of reception levels of a radio transmission line of the active system and a radio transmission line of the standby system with each of the upper-limit thresholds in a different order for each of the operational forms; and adaptively controlling switching among the n types of modulation modes on a switching condition in accordance with purport of the operation form based on a result of each of the comparisons.

2. The applicable modulation mode switching method according to claim 1, wherein when a reception level of a radio transmission line exceeds the upper-limit threshold, an upper-limit threshold exceeding state is maintained to deal with an active system and a standby system until the reception revel becomes equal to or lower than the lower-limit threshold, and in the transmission-quality-priority, the switching condition to the modulation mode of a system gain increasing direction is that one of a reception level of a radio transmission line of the active system and a reception level of a radio transmission line of the standby system becomes equal to or lower than the lower-limit threshold, and the switching condition to the modulation mode of a system gain decreasing direction is that both of the active system reception level and the standby system reception level exceed the upper-limit threshold.

3. The modulation mode switching method according to claim 1, wherein when a reception level of a radio transmission line becomes equal to or lower than the lower-limit threshold, a lower-limit threshold not-exceeding state is maintained to deal with an active system and a standby system until the reception revel exceeds the upper-limit threshold, and in the transmission-capacity-priority, a switching condition to the modulation mode of a system gain increasing direction is that both of a reception level of a radio transmission line of the active system and a reception level of a radio transmission line of the standby system become equal to or lower than the lower-limit threshold, and a switching condition to the modulation mode of a system gain decreasing direction is that one of the active reception level and the standby reception level exceeds the upper-limit threshold.

4. The modulation mode switching method according to claim 1, wherein, in the comparison step, a comparison by the upper-limit comparison unit is followed by a comparison by the lower-limit comparison unit in a case of the transmission-quality-priority, whereas a comparison by the lower-limit comparison unit is followed by a comparison by the upper-limit comparison unit in a case of the transmission-capacity-priority.

5. The modulation mode switching method according to claim 1, wherein the modulation mode of a system gain increasing direction is QPSK, and the modulation mode of a system gain decreasing direction is QAM.

6. The modulation mode switching method according to claim 1, wherein the redundant configuration is a FD (Frequency diversity) configuration.

7. A modulation mode switching type communication device in a point-to-point radio communication system in which a modulation mode to be used can be switched among n types of modulation modes and a radio transmission line has a redundant configuration of an active system and a standby system, the modulation mode switching type communication device comprising:

a setting unit in which one of a transmission-quality-priority operational form and a transmission-capacity-priority operational form, and (n−1) types of lower-limit thresholds used for switching to a modulation mode direction of a system gain increasing direction and (n−1) types of upper-limit thresholds used for switching to a modulation mode direction of a system gain decreasing direction are set in advance;

a lower-limit comparison unit that compares each of reception levels of a radio transmission line of the active system and a radio transmission line of the standby system with each of the lower-limit thresholds in a different order for each of the operational forms;

a upper-limit comparison unit that compares each of reception levels of a radio transmission line of the active system and a radio transmission line of the standby system with each of the upper-limit thresholds in a different order for each of the operational forms; and a determination unit that adaptively controls switching among the n types of modulation modes on a switching condition in accordance with purport of the operation form based on a result of each of the comparisons.

8. The modulation mode switching type communication device according to claim 7, wherein the determination unit comprises a high-level flag to deal with an active system and a standby system, the high-level flag being set when a reception level of the radio transmission line exceeds the upper-limit threshold, and being reset when the reception level becomes equal to or lower than the lower-limit threshold, and in a case of the transmission-quality-priority, the switching condition to the modulation mode of a system gain increasing direction is that one of a reception level of a radio transmission line of the active system and a reception level of a radio transmission line of the standby system becomes equal to or lower than a lower-limit threshold; the switching condition to the modulation mode of the system gain decreasing direction is that a reception level of a radio transmission line of the active system (standby system) exceeds the upper-limit threshold and a high-level flag corresponding to the standby system (active system) is being set; and a current modulation mode is maintained in other cases.

9. The modulation mode switching type communication device according to claim 7, wherein the determination unit comprises a low-level flag to deal with an active system and a standby system, the low-level flag being set when a reception level of the radio transmission line becomes equal to or lower than the lower-limit threshold, and being reset when the reception level exceeds the upper-limit threshold, and in a case of the transmission-capacity-priority, the switching condition to the modulation mode of a system gain decreasing direction is that one of a reception level of a radio transmission line of the active system and a reception level of a radio transmission line of the standby system exceeds the upper-limit threshold; the switching condition to the modulation mode of a system gain increasing direction is that a reception level of a radio transmission line of the active system (standby system) is equal to or lower than the lower-limit threshold and a low-level flag corresponding to the standby system (active system) is being set; and a current modulation mode is maintained in other cases.

10. The modulation mode switching type communication device according to claim 7, wherein, in the comparison step, the determination unit performs a comparison by the upper-limit comparison unit first and then a comparison by the lower-limit comparison unit in a case of the transmission-quality-priority, whereas the determination unit performs a comparison by the lower-limit comparison unit first and then a comparison by the upper-limit comparison unit in a case of the transmission-capacity-priority.

11. The modulation mode switching type communication device according to claim 7, wherein the modulation mode of a system gain increasing direction is QPSK, and the modulation mode of a system gain decreasing direction is QAM.

12. The modulation mode switching type communication device according to claim 7, wherein the redundant configuration is a FD (Frequency diversity) configuration.

13. A non-transitory modulation mode switching program recording medium in a point-to-point radio communication system in which a modulation mode to be used can be switched between QPSK and QAM and a radio transmission line has a redundant configuration of an active system and a standby system, wherein when the point-to-point radio communication system is in a transmission-quality-priority state, the modulation mode switching program comprising:

a first step of comparing a reception level of the radio transmission line with an upper-limit threshold used for switching to a modulation mode direction of a system gain decreasing direction for each of the active system and standby system;

a second step of, when the reception level is equal to or lower than an upper-limit threshold in the first step, comparing a reception level of the radio transmission line with a lower-limit threshold used for switching to a modulation mode direction of a system gain increasing direction for each of the active system and standby system;

a third step of, when the reception level is equal to or lower than the lower-limit threshold in at least one of the active system and standby system in the second step, setting a low flag and resetting a high flag for each of the active system and standby system to change the modulation mode to QPSK;

a fourth step of, when the reception level exceeds an upper-limit threshold in the first step, resetting a low flag and setting a high flag for each of the active system and standby system; and a fifth step of, when a high flag of the active system and a high flag of the standby system are set, changing the modulation mode to QAM.

14. A non-transitory modulation mode switching program recording medium in a point-to-point radio communication system in which a modulation mode to be used can be switched between QAM and QPSK and a radio transmission line has a redundant configuration of an active system and a standby system, wherein when the point-to-point radio communication system is in a transmission-capacity-priority state, the modulation mode switching program comprising:

a first step of comparing a reception level of the radio transmission line with a lower-limit threshold used for switching to a modulation mode direction of a system gain increasing direction for each of the active system and standby system;

a second step of, when the reception level exceeds a lower-limit threshold in the first step, comparing a reception level of the radio transmission line with an upper-limit threshold used for switching to a modulation mode direction of a system gain decreasing direction for each of the active system and standby system;

a third step of, when the reception level exceeds the upper-limit threshold in at least one of the active system and standby system in the second step, resetting a low flag and setting a high flag for each of the active system and standby system to change the modulation mode to QAM;

a fourth step of, when the reception level is equal to or lower than a lower-limit threshold in the first step, setting a low flag and resetting a high flag for each of the active system and standby system; and a fifth step of, when a low flag of the active system and a low flag of the standby system are set, changing the modulation mode to QPSK.

* * * * *